United States Patent
Suetsugu et al.

(10) Patent No.: US 6,768,845 B1
(45) Date of Patent: Jul. 27, 2004

(54) OPTICAL CABLE FOR HOLDING OPTICAL FIBER RIBBONS HAVING A PLURALITY OF ONE GROOVE SPACERS

(75) Inventors: Yoshiyuki Suetsugu, Kanagawa (JP); Hiroki Ishikawa, Kanagawa (JP); Hideyuki Iwata, Ibaraki (JP)

(73) Assignees: Sumitomo Electric Industries, Ltd., Osaka (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/505,989

(22) Filed: Feb. 17, 2000

(30) Foreign Application Priority Data

Feb. 19, 1999 (JP) .......................................... P. 11-41922

(51) Int. Cl.[7] ................................................. G02B 6/44
(52) U.S. Cl. ........................ 385/106; 385/102; 385/112
(58) Field of Search ................................ 385/106, 102, 385/112

(56) References Cited

U.S. PATENT DOCUMENTS

| | | | | |
|---|---|---|---|---|
| 5,233,678 A | * | 8/1993 | Katurashima et al. ...... | 385/112 |
| 5,517,591 A | * | 5/1996 | Wagman et al. ............ | 385/110 |
| 5,531,064 A | * | 7/1996 | Sawano et al. ............. | 57/204 |
| 5,630,002 A | * | 5/1997 | Ota et al. .................. | 385/111 |
| 5,638,478 A | * | 6/1997 | Iwakura et al. ............. | 385/111 |
| 5,651,082 A | * | 7/1997 | Eoll ........................... | 385/114 |
| 6,122,426 A | * | 9/2000 | Ishikawa et al. ............ | 385/105 |

FOREIGN PATENT DOCUMENTS

JP 4-182608 6/1992

* cited by examiner

Primary Examiner—Michael C. Zarroli
(74) Attorney, Agent, or Firm—McDermott Will & Emery LLP

(57) ABSTRACT

An optical cable has a plurality of one-groove spacers 3 which are twisted in one direction around a central member 1. Anti-tensile elements 2 are arranged in the central portion of the central member 1. Each one-groove spacer having a single groove which is linear lengthwise and substantially square in cross section and holding a stack of a plurality of optical fiber ribbons 4. The inner width and the height of the side walls of the groove of the one-groove spacer are set greater than the diagonal length of the stack. Therefore, the transmission loss becomes reducible because the contact portions of the optical fiber ribbons with respect to the side walls of the grooves vary in the longitudinal direction, thus preventing a specific number of optical fibers from being continuously subjected to edgewise pressure.

5 Claims, 5 Drawing Sheets

FIG. 6

| CABLE | | ONE-GROOVE SPACER | | MAXIMUM TRANSMISSION LOSS | | | |
|---|---|---|---|---|---|---|---|
| | | TWISTING DIRECTION | PITCH LENGTH (mm) | TWISTING PITCH LENGTH OF OPTICAL FIBER RIBBONS (mm) | | | |
| | | | | 1000 | 700 | 600 | 400 |
| FIRST EMBODIMENT | | S TWISTING | 700 | 0.28 | 0.24 | | 0.23 |
| | | SZ TWISTING | 700 | 0.26 | 0.25 | 0.22 | 0.21 |
| SECOND EMBODIMENT | | S TWISTING | INNER LAYER 700 | 0.27 | 0.23 | | 0.22 |
| | | SZ TWISTING | OUTER LAYER 700 | 0.28 | 0.24 | | 0.23 |
| | | S TWISTING | INNER LAYER 700 | 0.25 | 0.25 | 0.21 | 0.21 |
| | | SZ TWISTING | OUTER LAYER 700 | 0.26 | 0.25 | 0.22 | 0.21 |
| THIRD EMBODIMENT | | S TWISTING | 700 | 0.28 | 0.24 | | 0.23 |
| | | SZ TWISTING | 700 | 0.26 | 0.25 | 0.22 | 0.21 |

US 6,768,845 B1

OPTICAL CABLE FOR HOLDING OPTICAL FIBER RIBBONS HAVING A PLURALITY OF ONE GROOVE SPACERS

BACKGROUND OF THE INVENTION

1. Field of the Invention

The present invention relates to the structure of an optical cable for holding optical fiber ribbons.

2. Description of the Related Art

Optical cables are generally made through the steps of twining one-groove spacers around a central member, each one-groove spacer having a single groove which is substantially square in cross section and linear lengthwise, and holding an optical fiber ribbon or a stack of a plurality of optical fiber ribbons into the groove, or holding an optical fiber ribbon or a stack of a plurality of optical fiber ribbons into the respective grooves of a grooved spacer.

The optical cable disclosed in Unexamined Japanese Patent Publication No. Hei. 4-182608 has one-groove spacers wherein the inner width and the height of the side walls of the groove of each one-groove spacer are set greater than the diagonal length of a stack of a plurality of optical fiber ribbons so that the optical fiber ribbons are made freely movable in the groove. This structure is intended to prevent the optical cable from being damaged by bending stress acting from the outside during the manufacture, transport or laying of optical cables.

In such a conventional optical cable, however, the optical fibers of the optical fiber ribbons which are placed at a same side are kept in contact with the groove as illustrated in FIG. 5A. In FIG. 5A, reference numeral 3 denotes a one-groove spacer; and 4, optical fiber ribbons. When the bending stress is applied to the optical cable, the optical fiber ribbons 4 are pressed against the one side wall of the one-groove spacer 3 and the stress is concentrated on the portion indicated by the mark x. Consequently, the specific optical fibers which are in contact with the grooves are always subjected to the stress.

This is also the case with an optical cable having SZ-twisted one-groove spacers, that is, a plurality of one-groove spacers are twisted around a central member while reversing their direction at a given pitch length or SZ-shaped grooves of the grooved spacers, that is, grooves are formed so as to reverse their direction at predetermined pitch length. FIG. 7 is a perspective view of a grooved spacer having SZ-shaped grooves. In FIG. 7, reference numerical 111 denotes a grooved spacer; 112, an anti-tensile element; 113, an SZ-shaped grooves; and 114, an optical fiber ribbon. While not shown in FIG. 7, the grooved spacer 111 has a plurality of grooves 113. Symbols $S_1$ and $S_2$ indicate reversing portions, and symbol $S_0$ a conversion portion. The grooves 113 are formed so as to reverse their direction at predetermined pitch length, for example the predetermined pitch length being a length between the reversing portions $S_1$ and $S_2$. In the case of SZ twisting, only a limited number of optical fibers are brought into contact with the wall of the groove. Further, a greater stress is applied to the reversing portion $S_1$, $S_2$ where the twisting direction is reversed, so that specific optical fibers receive that greater stress. Therefore, the edgewise pressure applied to the specific optical fibers tends to become greater in the conventional optical cables, thereby results in an increase of transmission loss.

Even in the optical cable disclosed in the above-mentioned Unexamined Japanese Patent Publication No. Hei. 4-182608 wherein the optical fiber ribbons are allowed to freely move in the grooves, the stack of a plurality of optical fiber ribbons are as shown in FIG. 2 pressed against the side wall in one direction, which results in subjecting the optical fibers in contact with the side wall to the edgewise pressure, thus causing a micro bend loss. Therefore, only making the inner width and the height of the side walls of the groove greater than the diagonal length of the stack still remain insufficient to reduce the loss.

SUMMARY OF THE INVENTION

Accordingly, an object of the present invention is to provide an optical cable wherein specific optical fibers are set free from an increase in transmission loss.

The above-mentioned object can be achieved by an optical cable having at least one groove which is spirally provided, the each groove being substantially square in cross section and holding an optical fiber ribbon or a stack of a plurality of optical fiber ribbons within the groove. In the cable, an inner width and a height of side walls of the each groove are set greater than a width of the optical fiber ribbon or a diagonal length of the stack which is held into the groove and the optical fiber ribbon or the stack held into the groove is twisted lengthwise in one direction.

In accordance with a first aspect of the present invention, in the above-mentioned optical cable, it is preferable that the optical cable further comprises a central member and at least one spacer having the at least one groove, wherein the spacer is twisted around the central member spirally. For example, the spacer is one-groove spacer having the one groove being linear lengthwise.

In the above-mentioned structure, it is advantageous that the one-groove spacer is twisted in one direction around the central member and a twisting pitch length of the optical fiber ribbons is equal to or less than a twisting pitch length of the one-groove spacer.

It is also advantageous that the one-groove spacer is twisted around the central member while reversing its direction at a given pitch length. In such a optical cable, it is preferable that a twisting pitch length of the optical fiber ribbons is equal to or shorter than a pitch length of the one-groove spacer, the pitch length of the one-groove spacer being twice as large as the given pitch length, and the pitch length of the one-groove spacer is not integer times as large as the twisting pitch length of the optical fiber ribbons.

Further, in the above-mentioned structure, it is advantageous that the central member is a grooved spacer having at least one groove on its surface, each groove being spiral lengthwise and substantially square in cross section and holding an optical fiber ribbon or a stack of a plurality of optical fiber ribbons within the groove. In such a optical cable, it is preferable that an inner width and a height of side walls of the each groove of the grooved spacer are set greater than a width of the optical fiber ribbon or a diagonal length of the stack which is held into the groove of the grooved spacer and the optical fiber ribbon or the stack held into the groove of the grooved spacer is twisted lengthwise in one direction.

It is also advantageous that the optical cable further comprises one-groove spacers spirally being twisted around the one-groove spacers which are twisting around the central member.

In accordance with a second aspect of the present invention, in the above-mentioned optical cable, it is preferable that the optical cable further comprises a central member, wherein the central member is a grooved spacer having the at least one groove on its surface, each groove being spiral lengthwise.

In the above-mentioned structure, it is advantageous that the groove is a spiral groove being spirally formed in one direction on the surface of the grooved spacer and a twisting pitch length of the optical fiber ribbons is equal to or less than a spiral pitch length of the groove of the grooved spacer.

Further, it is advantageous that the groove is an SZ-shaped groove being spirally formed so as to reverse their at predetermined pitch length. In such an optical cable, it is preferable that a twisting pitch length of the optical fiber ribbons is equal to or shorter than a pitch length of the grooved spacer, the pitch length of the grooved spacer being twice as large as the predetermined pitch length, i.e. the length between reversing portions $S_1$ and $S_3$ as depicted in FIG. 7, and the pitch length of the groover spacer is not integer times as large as the twisting pitch length of the optical fiber ribbons.

BRIEF DESCRIPTION OF THE DRAWINGS

FIG. 6 is a table explanatory of the measured results of maximum transmission losses when the twisting pitch length of the optical fiber ribbons is varied with the twisting pitch length of one-groove spacers.

DETAILED DESCRIPTION OF THE PREFERRED EMBODIMENTS

Figure 1:
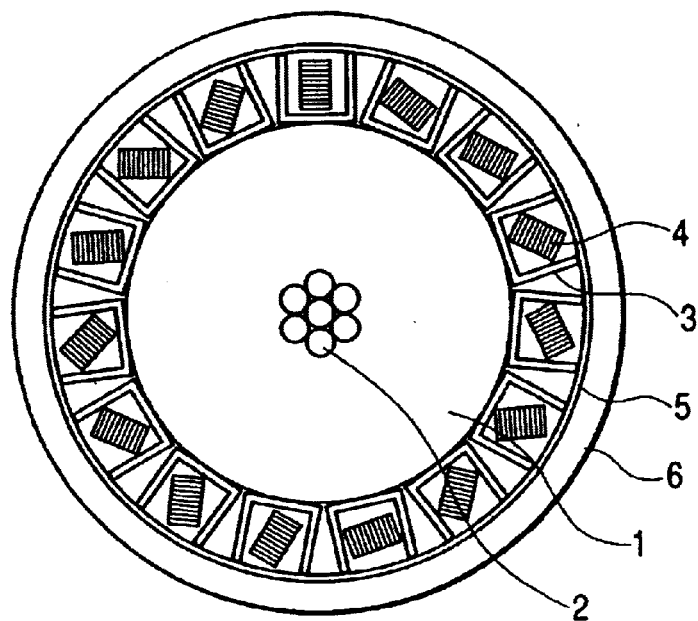
FIG. 1 is a sectional view illustrating a first embodiment of an optical cable according to the invention.

FIG. 1 is a sectional view illustrating an optical cable as a first embodiment of the invention. In FIG. 1, an optical cable has a central member 1; an anti-tensile element 2; a one-groove spacer 3; optical fiber ribbons in the form of a tape 4; a hold-down winding 5; and an outer coating 6.

Although the central member 1 is formed by enclosing the anti-tensile element 2 with synthetic resins, the anti-tensile element is not necessarily required, depending on the use of the optical cable. The one-groove spacer 3 has a single groove which is linear lengthwise and substantially square in cross section and holding the optical fiber ribbons 4, a plurality of one-groove spacers 3 being twisted in one direction around the central member 1. In the groove of the one-groove spacer 3, there is held an optical fiber ribbon or a stack of a plurality of optical fiber ribbons. Moreover, the hold-down winding 5 is applied as occasion demands thereto and then the above assembly is coated with the outer coating 6.

The optical fiber ribbons 4 held into the one-groove spacer 3 are twisted lengthwise in one direction. The direction in which the optical fiber ribbons are twisted may be identical with or opposite to the direction in which the one-groove spacer 3 is twisted around the central member 1. In order to make it possible to twist the optical fiber ribbons 4 within the groove of the one-groove spacer 3, the inner width and the height of the side walls of the groove of the one-groove spacer 3 are set greater than the width of the optical fiber ribbons 4 when one optical fiber ribbon 4 is held into the groove. Further, the inner width and the height of the side walls of the groove of the one-groove spacer 3 are set greater than the diagonal length of stack of the plurality of optical fiber ribbons when a plurality of optical fiber ribbons are held into the groove while being stacked.

Figure 5A:
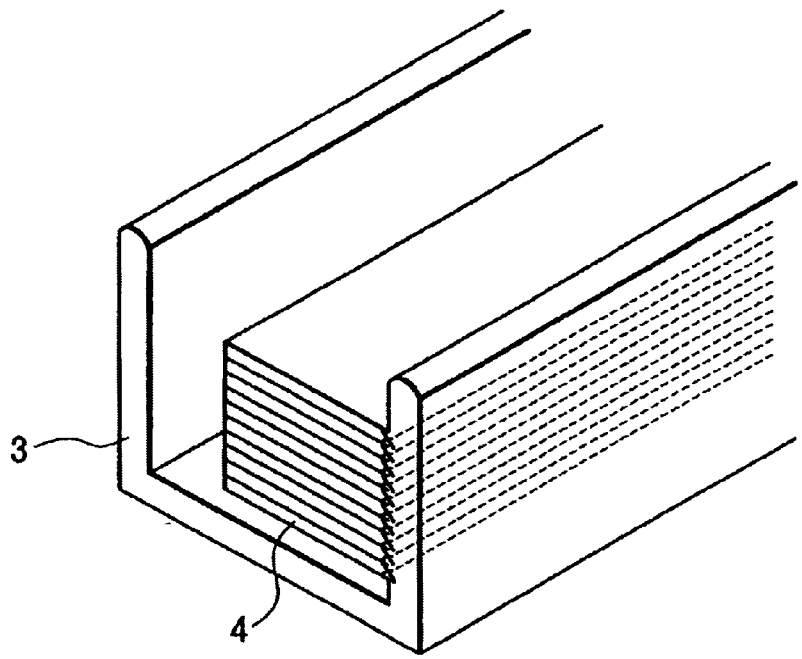
FIG. 5A is a diagram illustrating the contact condition of optical fiber ribbons with respect to the side walls of grooves.
Figure 5B:
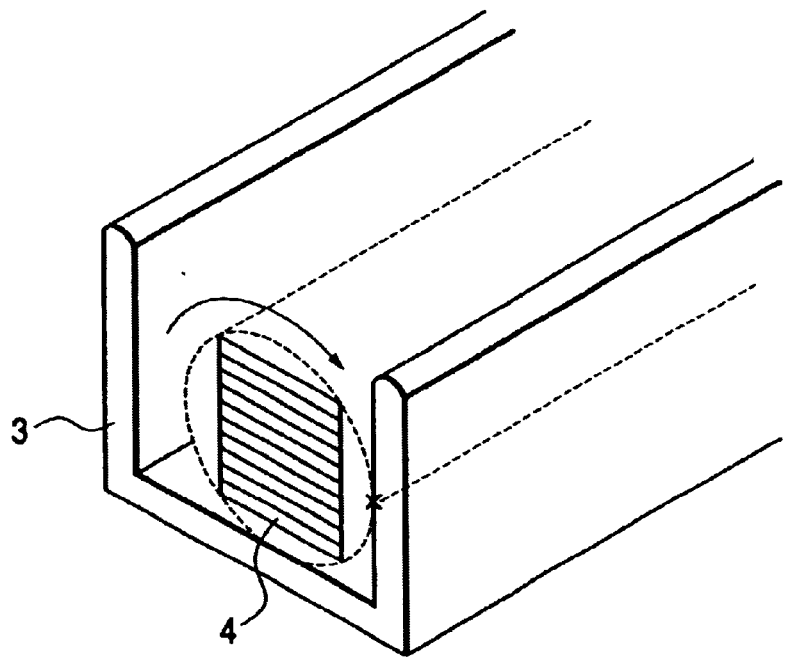
FIG. 5B is a diagram illustrating the contact condition of optical fiber ribbons with respect to the side walls of grooves.
Figure 7:
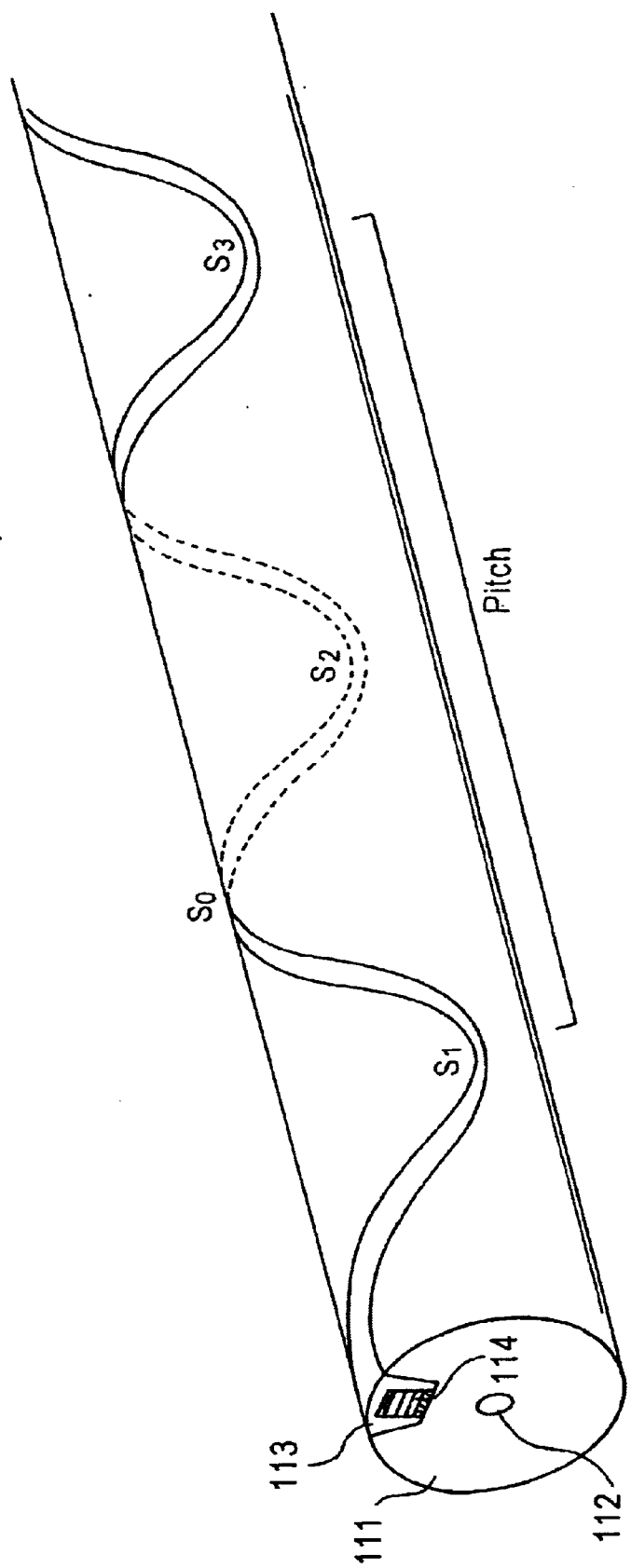
FIG. 7 is a perspective view of a grooved spacer having SZ-shaped grooves.

FIG. 5B shows a state wherein the optical fiber ribbons have been twisted before being held into the one-groove spacer 3. The circle indicated by a dotted line shows an envelope because of the twisting. The mark x in FIG. 5B refers to a position where the envelope is brought into contact with the inner wall of the groove. When the optical fiber ribbons 4 held into the groove are twisted, contact portions of the optical fiber ribbon 4 in contact with the inner wall of the groove varies in the lengthwise direction, so that the transmission characteristics are stabilized without causing any particular optical fiber to be continuously subjected to edgewise pressure.

When the optical fiber ribbons 4 are thus twisted, it is advantageous to set the twisting pitch length of the optical fiber ribbons 4 equal to or shorter than the twisting pitch length of the one-groove spacers 3 so as to effectively disperse the edgewise pressure.

In first embodiment of the optical cable having the structure shown in FIG. 1, seven steel wires each having a diameter of 2 mm are twisted into the anti-tensile element 2 and they are enclosed with polyethylene (PE) so as to form the central member 1. Each one-groove spacer 3 is made of polybutylene terephthalate (PBT) having an outer width of 6.5 mm, a height of 5.0 mm, an inner groove width of 5.5 mm, and a side groove wall height of 4.5 mm. In this case, fifteen one-groove spacers 3 are twisted around the central member 1 and then subjected to the hold-down winding 5 before a 2-mm thick outer coating 6 is added thereto, so that an optical cable having an outer diameter of about 38 mm is formed. Each tape of 8-fiber optical fiber ribbons held into each groove is 2.1 mm wide and 0.3 mm thick., and the ten optical fiber ribbons are stacked to produce an optical cable having 1,200 fibers. Incidentally, the diagonal length of the stack of the plurality of optical fiber ribbons is 3.66 mm.

Figure 2:
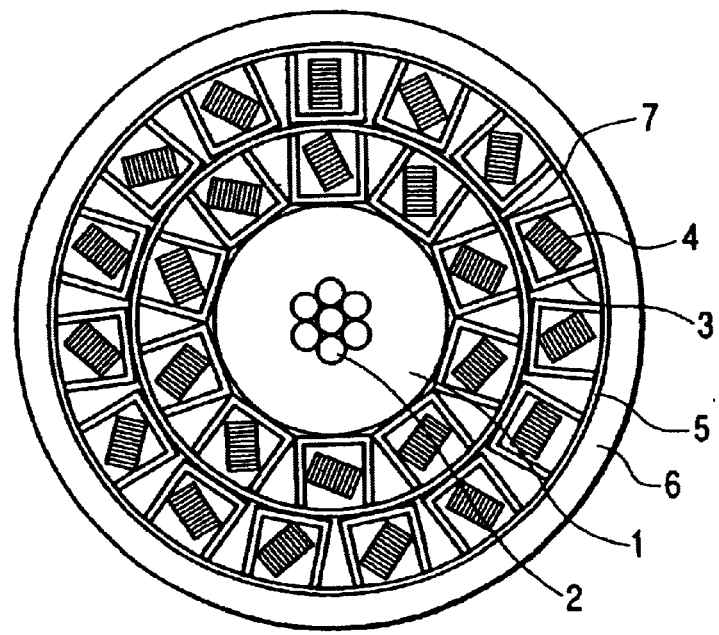
FIG. 2 is a sectional view illustrating a second embodiment of an optical cable according to the invention.

FIG. 2 is a sectional view illustrating an optical cable as a second embodiment of the invention, wherein like reference numerals designate like elements in FIG. 1 and the description thereof will be omitted, reference numeral 7 denoting a hold-down winding.

According to this embodiment of the invention, there are two layers of one-groove spacers 3, each layer comprising a plurality of one-groove spacers 3. Two layers of one-groove spacers 3 are twisted in one direction, that is, in the same direction around the central member 1. A hold-down winding 7 may be applied in between the two layers of one-groove spacers 3. The optical fiber ribbons held into each groove are twisted likewise as in the first embodiment of the invention.

Numerical values according to this embodiment of the invention are similar to those used to define the first embodiment thereof; namely, the number of one-groove spacers 3 is ten in the inner layer and fifteen in the outer layer, thus constituting a 2,000-fiber optical cable.

Figure 3:
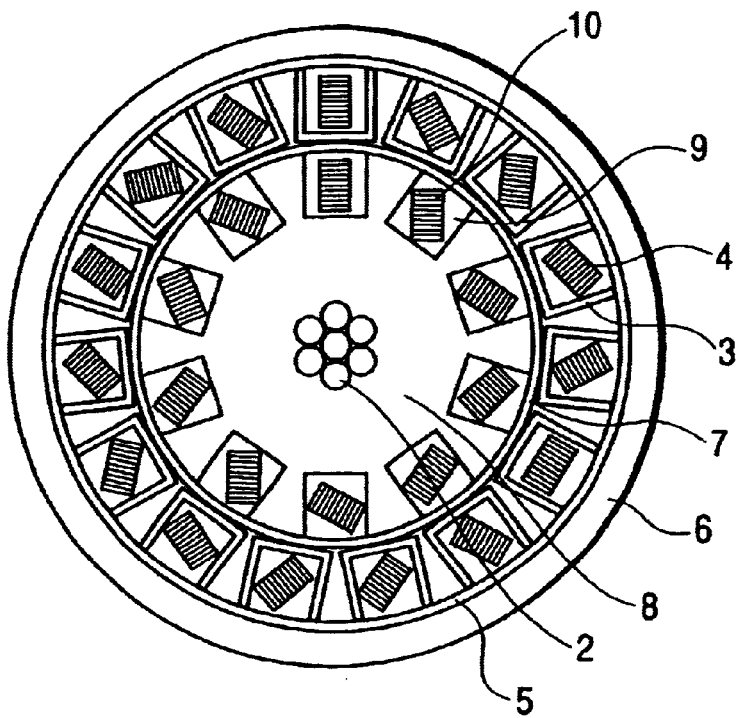
FIG. 3 is a sectional view illustrating a third embodiment of an optical cable according to the invention.

FIG. 3 is a sectional view illustrating an optical cable as a third embodiment of the invention, wherein like reference numerals designate like elements in FIGS. 1 and 2, and the description thereof will be omitted, reference numeral 8 denoting a grooved spacer; 9, the groove of the spacer; and 10, optical fiber ribbons.

According to this embodiment of the invention, the grooved spacer B having the grooves 9 are employed as the central member. The groove 9 of the spacer B is spirally formed in one direction. With respect to the optical fiber ribbons 10 held into the groove 9 of the spacer 8, they may be twisted in one direction and held into, the spacer groove 9 as in the aforementioned embodiments or may be left free from twisting as in the conventional art.

The optical fiber ribbons 4 held into the respective one-groove spacers 3 twisted in one direction around the spacers 8 are twisted and held therein as described above.

More specifically, the numerical values of the one-groove spacer 3 are similar to those described in the first embodiment of the invention; namely, the number of one-groove spacers is 15 and the 8-fiber optical fiber ribbons 4 are held into every groove 9 similar to the second embodiment of the invention. Further, the numerical values of the groove 9 are 10. Accordingly, there is provided a 2,000-fiber core optical cable.

Figure 4:
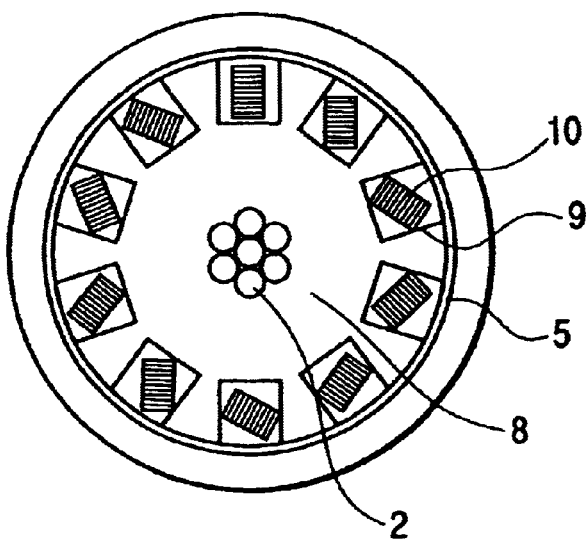
FIG. 4 is a sectional view illustrating a fourth embodiment of an optical cable according to the invention.

FIG. 4 is a sectional view illustrating an optical cable as a fourth embodiment of the invention, wherein like reference numerals designate like elements in FIGS. 1 and 3, and the description thereof will be omitted.

According to this embodiment of the invention, the optical fiber ribbons 10 are held into the groove 9 of the spacer 8 without using the one-groove spacer 3 and the hold-down winding 5 is applied as occasion demands thereto before the outer coating 6 is added thereto. The groove 9 is longitudinally and spirally formed in one direction and the optical fiber ribbons 10 that have been twisted in one direction are held into at least one groove 9.

With respect to an optical cable having the optical fiber ribbons held into the grooved spacer, in case of an arrangement of optical fiber ribbons wherein the strain applied to particular fibers develops any problem when the optical cable is bent, by twisting the optical fiber ribbons 10 in one direction and then holding them in the respective grooves 9 as described in this embodiment of the invention, contact portions of the optical fiber ribbon 4 in contact with the inner wall of the groove varies in the lengthwise direction. Accordingly, the transmission characteristics are stabilized without causing any particular optical fiber to be continuously subjected to edgewise pressure. Further, when the optical fiber ribbons are twisted, it is advantageous to set the twisting pitch of the optical fiber ribbons 10 equal to or shorter than the spiral pitch of the spacer grooves 9 so as to effectively disperse the edgewise pressure.

The one-groove spacers 3 has been twisted in one direction and the grooves 9 has been spiraled in one direction, that is, they have been subjected S- or Z-twisting according to the embodiments 1 to 4 of the invention. However, the invention is not limited to such S- or Z-twisting but may be applicable to SZ-twisting likewise. In other words, the one-groove spacers 3 described in the embodiments 1 to 4 of the invention may be subjected the SZ-twisting and the spiral direction of the groove 9 of the spacer 8 may be SZ-shaped. The optical fiber ribbons twisted are held into the respective grooves thereof. By holding the optical fiber ribbons thus twisted therein, the edgewise pressure can be prevented from centering on the particular optical fiber ribbons.

With one reversing period in the direction of the SZ twisting of the one-groove spacer 3 (the reversing period being twice as large as the length between adjacent reversing portions) as the pitch length of the one-groove spacers 3 and with one spiral reversing period of the spacer groove 9 (the spiral reversing period being twice as large as the length between adjacent reversing portions) as the pitch length of the grooved spacers 9, it is advantageous to set the twisting pitch length of the optical fiber ribbons equal to or shorter than the pitch length of the one-groove spacers 3 or the pitch length of the grooved spacers so as to effectively disperse the edgewise pressure.

Further, in the case where the optical cable with the one-groove spacers subjected to the SZ twisting is formed or where the optical cable with the slot grooves subjected to the twisting is formed, there is some possibility of causing great force to be applied to each reversing portion in any other place from the wall surface of the groove. In this case, the same optical fibers are brought into contact with the slot wall in that portion, so that the optical fibers thus being brought into contact therewith tend to become increasingly damaged because greater stress is applied thereto. In consideration of this fact, the pitch length of the one-groove spacers 3 or the pitch length of the spacer grooves 9 of the grooved spacers 8 should not preferably be set at integer times as large as the twisting pitch length of the optical fiber ribbons so as to decrease the transmission loss.

FIG. 6 is a table showing measured results of maximum transmission losses when the twisting pitch lengths of optical fiber ribbons are varied with the pitch lengths of one-groove spacers in the examples of optical cables in the first to third embodiments of the invention using the one-groove spacers. As shown in the table above, the maximum transmission loss is made reducible and the edgewise pressure is made effectively dispersible by setting the twisting pitch length of the optical fiber ribbons equal to or shorter than the twisting pitch length of the one-groove spacers. In this case, the maximum transmission losses were measured by light having a wavelength of 1.55 $\mu$m.

According to the present invention, the contact portions of the optical fiber ribbons with respect to the side walls of the grooves can be dispersed even though the optical fiber ribbons are brought into contact with any one side wall thereof, since the optical fiber ribbons have been twisted and held into the respective grooves, so that the transmission loss becomes reducible. Therefore, it is possible to reduce an increase in transmission loss resulting from allowing a specific number of fibers to continuously contact the grooves as in any one of conventional optical cables.

Moreover, according to the present invention, the twisting pitch length of the optical fiber ribbons is set equal to or shorter than the twisting pitch length of the one-groove spacers or the spiral pitch of the spacer grooves. Accordingly, the contact portions of the optical fiber ribbons can be dispersed with further efficiency.

Furthermore, according to the present invention, the pitch length of the one-groove spacers or the pitch length of the grooved spacers is not set at integer times as large as the twisting pitch length of the optical fiber ribbons. Accordingly, it is possible to reduce an increase in transmission loss resulting from allowing a specific number of fibers to be applied the great stress at the reversing portions.

The present invention is based on Unexamined Japanese Patent Publication No. Hei. 11-41922 which is incorporated herein by reference.

Although the invention has been described in its preferred form and structure with a certain degree of particularity, it is understood that the present disclosure of the preferred form can be changed in the details of structure and in the combination and arrangement of parts without departing from the spirit and the scope of the invention as hereinafter claimed.

What is claimed is:

1. An optical cable comprising a central member, said central member is a grooved spacer having at least one SZ-shaped groove twisted around said central member spirally, each groove being spirally formed so as to reverse its direction at a predetermined pitch length and each groove being substantially square in cross section and holding an optical fiber ribbon or a stack of a plurality of optical fiber ribbons within the groove, wherein a twisting pitch length of said optical fiber ribbon or said stack of a plurality of optical fiber ribbons is equal to or shorter than a pitch length of the grooved spacer, said pitch length of the grooved spacer being twice as large as the predetermined pitch length.

2. An optical cable according to claim 1, wherein the pitch length of the grooved spacer is not an integer times as large as the twisting pitch length of the optical fiber ribbons.

3. An optical cable according to claim 1, wherein an inner width and a height of side walls of the each groove of the grooved spacer are set greater than a width of the optical fiber ribbon or a diagonal length of the stack which is held into said groove of the grooved spacer and said optical fiber ribbon or said stack held into said groove of the grooved spacer is twisted lengthwise in one direction.

4. An optical cable according to claim 1, further comprising two layers of one-groove spacers which are twisted around said central member.

5. An optical cable having two layers of one-groove spacers which are spirally twisted around a central member, each one-groove spacer being substantially square in cross section and holding an optical fiber ribbon or a stack of a plurality of optical fiber ribbons within the groove, wherein an inner width and a height of side walls of the each groove are set greater than a width of the optical fiber ribbon or a diagonal length of the stack which is held into said groove and said optical fiber ribbon or said stack held into said groove is twisted lengthwise in one direction.

* * * * *